(No Model.)
J. A. RINGS.
CURTAIN POLE RING.
No. 460,793.  Patented Oct. 6, 1891.
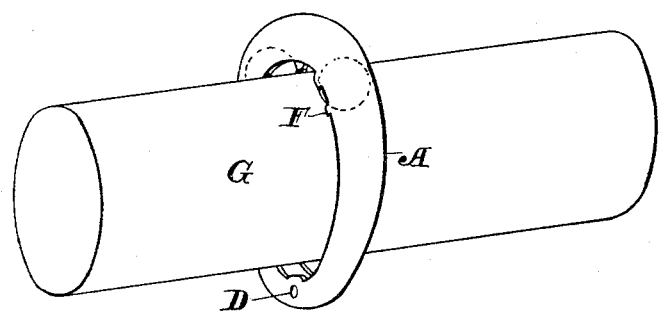
Fig. 1.
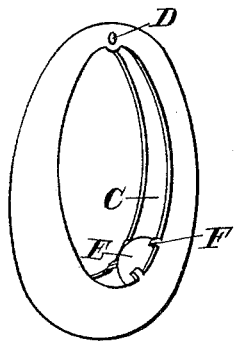
Fig. 2.
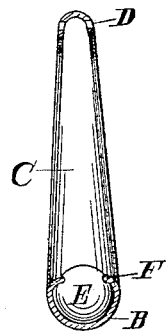
Fig. 3.
WITNESSES:
S. Marvin
Thomas Staley
INVENTOR
J. A. Rings.
BY 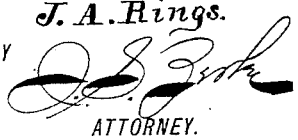
ATTORNEY.

UNITED STATES PATENT OFFICE.

JULIUS A. RINGS, OF NEW YORK, N. Y.

CURTAIN-POLE RING.

SPECIFICATION forming part of Letters Patent No. 460,793, dated October 6, 1891.

Application filed January 15, 1890. Serial No. 337,027. (No model.)

*To all whom it may concern:*

Be it known that I, JULIUS A. RINGS, a citizen of the United States, and a resident of New York, in the county of New York and State of New York, have invented certain new and useful Improvements in Curtain-Pole Rings and for other Uses, of which the following is a specification The object of my invention is to make a ring for use on curtain-poles or for use in the rigging of vessels, which is constructed of one piece of metal and provided with anti-friction balls or bearings, so as to obviate the use of rivets, screws, or other means of securing the parts together or holding the balls in place, and whereby the same can be cheaply made.

Referring to the accompanying drawings, Figure 1 is a perspective view of my improved ring as applied to a curtain-pole; Fig. 2, a perspective view of the ring, and Fig. 3 a vertical cross-section of the same.

The ring A is made of one piece, either stamped, drawn, or cast in the shape shown, the outer surface of the ring being rounded, as shown at B, while on the inside is an annular rounded channel or way C. In its lower end is an eye D, to which a cord or hook is usually attached.

In the upper end of the ring, which is inclosed, preferably, two balls E E are placed within the U-shaped channel C, and these balls are held in position loosely by means of lugs F, integral with the edge, which lugs are inturned to hold in the balls. It will be seen that the balls are large enough to project above the rim or edge of the ring, and when, therefore, the ring is placed on the pole G the balls are in contact therewith, and thus permit the ring to be readily moved back and forth.

The ring thus made may be cast in the form shown, U-shaped in cross-section, or provided with the annular groove therein, as that form enables me to make the product much lighter; but I prefer, as stated, to have them spun or stamped or drawn in the shape shown.

I am aware that it is not new to show ball-bearings held in sockets by fingers integral with the walls thereof, and I do not lay any claim to such structure, broadly; but I am not aware that a sheet-metal stamped or spun ring U-shaped in cross-section, as shown, has ever been made to hold balls therein. One very important feature of this invention consists in the fact that when the ring is thus made and the fingers are turned over to hold in the balls the smooth surface of the ring serves as an excellent socket or bearing for the balls without further finish. In casting the rings with these sockets they should be finished with a tool to provide a uniform bearing, and I avoid this by the form of socket provided in the U-shaped stamped or spun ring.

What I claim as new is—

As a new article of manufacture, a drawn or stamped sheet-metal ring U-shaped in cross-section to provide an annular cavity within, having an eye at one side of the ring and opposite thereto fingers or teeth integral with and projecting from the edges, in combination with balls within the cavity and held in place by said fingers, substantially as set forth.

Signed at New York, in the county of New York and State of New York, this 11th day of January, A. D. 1890.

JULIUS A. RINGS.

Witnesses:
J. S. ZERBE,
I. S. ELKINS.